United States Patent [19]

Anders et al.

[11] Patent Number: 4,471,826

[45] Date of Patent: Sep. 18, 1984

[54] PNEUMATIC TIRE

[75] Inventors: Uwe Anders, Jesteburg; Rainer Draeger, Schneverdingen; Klaus Jordan, Moelln; Klaus Meier, Buxtehude; Joachim Thorns, Seevetal, all of Fed. Rep. of Germany

[73] Assignee: Phoenix Aktiengesellschaft, Harburg, Fed. Rep. of Germany

[21] Appl. No.: 519,890

[22] Filed: Aug. 3, 1983

Related U.S. Application Data

[63] Continuation of Ser. No. 193,979, Jan. 22, 1981, abandoned.

[30] Foreign Application Priority Data

Oct. 6, 1979 [DE] Fed. Rep. of Germany ....... 2940580

[51] Int. Cl.$^3$ .......................... B60C 1/00; B60C 9/18
[52] U.S. Cl. .......................... 152/209 R; 152/352 R; 152/357 A; 152/359; 152/361 R; 156/125
[58] Field of Search .......... 152/352 R, 352 A, 353 R, 152/353 C, 353 G, 357 A, 361 R, 361 FP, 361 DM, 359, 356, 209 R, 152; 156/125

[56] References Cited

U.S. PATENT DOCUMENTS 4,257,836  3/1981  Benezél ..................... 156/125
4,312,394  1/1982  Thorns et al. ................ 152/357 A

FOREIGN PATENT DOCUMENTS 0006425  1/1980  European Pat. Off. ............ 156/125
2619942  11/1977  Fed. Rep. of Germany .

Primary Examiner—Lois E. Boland
Attorney, Agent, or Firm—Collard, Roe & Galgano

[57] ABSTRACT

A motor vehicle pneumatic tire is made of polyurethane or another similar moldable material which hardens into an elastic plastic material and which has a substantially cylindrical or cylindrical belt insert mounted beneath the tread substantially composed of threads, wires or similar stability support elements which are mounted in the circumferential direction of the tire in a spaced-apart manner at a distance of 0.5–3.0 mm and which elements have a cross section of 0.5–2.5 mm. The stability support and the plastic mass of the belt insert encompassing the same having a tensile strength in the circumferential direction of at least 3 Mill.N and the elements of the stability support have a breaking strength of at least 1,500 N.

4 Claims, 2 Drawing Figures

FIG.1
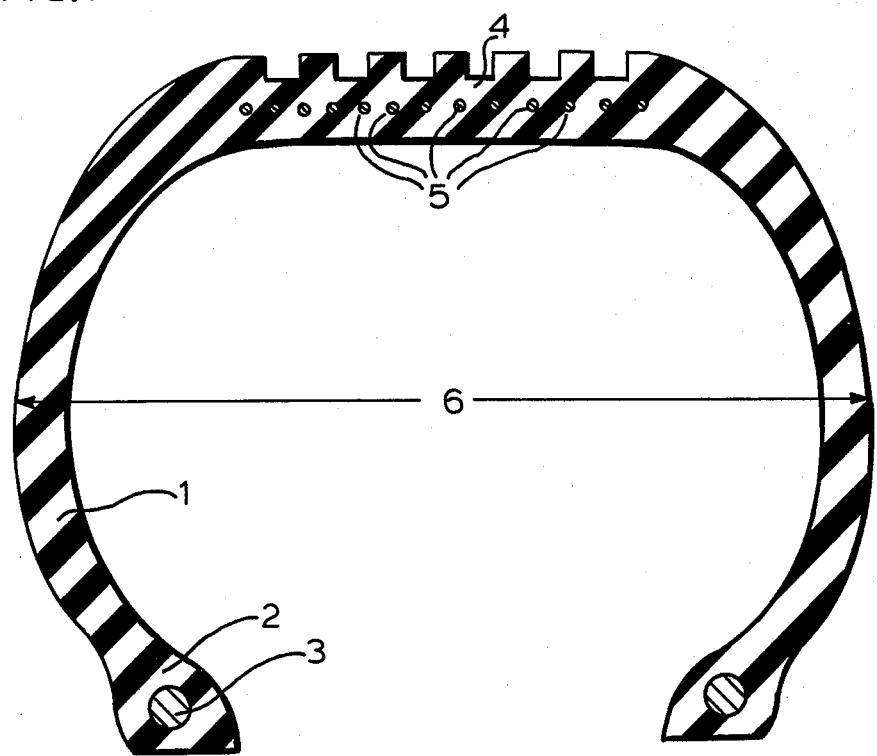
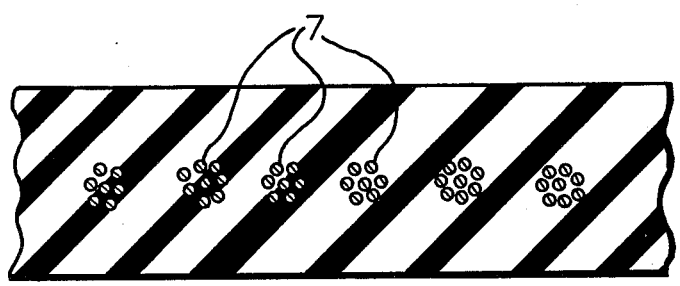
FIG.2

PNEUMATIC TIRE

This application is a continuation application of application Ser. No. 193,979, filed Jan. 22, 1981, now abandoned.

The invention relates to a motor vehicle pneumatic tire made of polyurethane or another similar moldable material which hardens into an elastic plastic material. More particularly, it relates to such a vehicle tire having a cylindrical or substantially cylindrical belt insert mounted beneath the tread made substantially of threads, wires or similar stability supports which run in the circumferential direction of the tire and which are spaced apart from each other or other similar stability supports.

Tires having such a structure are known from German laid open U.S. Pat. No. 2,619,942. Generally, these types of tires are called molded tires. The invention is based thereon.

With polyurethane and the materials similar to polyurethane, it is important that these materials are moldable before hardening and that the obtained physical characteristics of the chemically converted materials after hardening are maintained. The belt is formed by the stability supports or strength carriers which run in a circumferential direction. They are at an angle of zero or only a small angle with respect to the circumferential direction of the tire. The angle is preferably less than 2°. This angle is the result of the belt width, the belt circumference and the thread distance or spacing. Up to now, molded tires have not had the same running capacities as can be obtained with conventional tires. On the other hand, the driving characteristics of the tires of known construction are also imperfect. Furthermore, a molded tire must assure the generally high degree of safety against blowouts, as is common in conventional tires.

It is therefore an object of this invention to provide a belt construction which keeps the expansion of the tire, due to the inner pressure of the tire and the centrifugal forces, relatively low.

It is a further object of the invention to provide such a belt insert which is not subjected to any undesirable and intense deformations during operation, so that a high safety, high running capacity and good driving characteristics can be obtained.

This object of the invention is obtained in accordance with the invention by incorporating in a tire of the aforementioned type the following combination of features:

(a) the stability support and the plastic mass of the belt insert encompassing the same have a tensile strength in the circumferential direction of at least 3 Million Newtons; and
(b) the individual stability supports have a breaking or rupture strength of at least 1,500 Newtons.

The distance or spacing of the stability supports takes into consideration the penetration ability of the belt through the still liquid plastic when making the tire and temporarily appearing stress on the plastic mass proximate to the stability supports during operation of the tire on the road. It is therefore necessary that the stability supports have a defined upper and lower limit with respect to said spacing.

The lowest tensile strength or stress stiffness of 3 Million Newtons assures that the expansion of the circumference of the tire stays clearly below 1%. Also, the deformation of the radius of curvature under the influence of the inner pressure and the centrifugal forces is of considerable importance for the drive characteristics of the tire.

Therefore, the radius of curvature should be at least 270 mm, based upon a cylindrical or substantially cylindrical belt. Practically, it is in the limits of between 270 and 400. Larger radiuses of curvature are, however, also possible. Due to the low deformation of less than 1% in the belt area, a high running capacity can be obtained under these conditions. The material polyurethane and polyurethane-like materials fall clearly below the mechanical destruction limit of such a tire.

Due to the unusually high radius of curvature, one obtains a high ground standing pressure distribution which is of vital importance to the drive characteristics. Also, the stress stiffness or tensile strength and the large radius of curvature are also effectively related together with the spacing and cross sections of the stability supports. When the aforementioned limit values are maintained, one obtains a tire which, in comparison with conventional belt tires, has a high quality level in conjunction with the usual life span requirements, and also one which has high drive capabilities and high drive characteristics. In particular, a low rolling friction is obtained.

Under the terms "stress stiffness" or "tensile strength", it is to be understood to mean the resistance which an element affords against stress loads. Tensile strength is defined as the product of the E-modulus and the cross section. The tensile strength describes the elastic behavior of the circular-like belt.

A further important feature of the tire is in the so-called "flatness-value" (F). It consists of the quotient of the transverse radius of curvature R and tire width B. The following formula shows the relationship between them;

$$F = (2R/B)$$

The value of F should be in the range of 2.5–4.5. In order to obtain this value with the aforementioned construction, the aforementioned high stress stiffness of 3 Million Newtons is required.

A further feature of this inventive belt construction is the protection it affords against blowouts or breaking of its belt stability supports. In contrast to the conventional belt tires, the tensile force on the individual threads is particularly high in this polyurethane tire conception, so that a particularly high breaking or rupture strength behavior of the threads employed is required for assuring the service life and the continuous loadability of the tire.

In order to meet the standards of conventional tires, a thread material is required which has a minimum breaking stress of 1,500 Newtons. The thread material for all tires may consist of materials like steel and inorganic or organic synthetic fibers. The threads should have a breaking stress or rupture strength of 2,500 Newtons.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

In the drawing, wherein similar reference characters denote similar elements through the several views:

FIG. 1 is a cross-sectional view of a tire embodying the present invention; and

FIG. 2 is an enlarged, fragmentarily-illustrated sectional view of a portion of the tire, showing in greater detail the belt insert.

In accordance with FIG. 1, the tire body 1 is made of polyester-urethane and is provided with a bead cord or wires 3 in the tire edge or bead 2. Beneath the tire tread 4 a belt insert 5 is provided. It consists of a unitary long wire cord which is embedded in parallel windings in the tire. The wire cord is disposed at an angle of about 0.5° with respect to the circumferential plane or direction of the tire. The windings are positioned in a substantially cylindrical plane. A flatness value of 3.5 is obtained from the tire width 6 and the radius of curvature R is about 270 cm. The tensile strength is 3.6 Million Newtons.

As can be seen more clearly in FIG. 2, the stability supports 7 consist of a cord made of a plurality of individual threads or filaments. The cord may be formed of steel, polyester, aromatic polyamides, glass and materials of similar tensile strength. The cross section of this cord should be in the range of 0.5 to 2.5 mm, preferably 1.0 to 1.9 mm, and the spacing distance from one edge to the next should be in the range of 0.5 to 3.0 mm. The cross section of the cord shown in FIG. 2 is 1.8 mm, and the spacing distance from one edge to the next is 1.2 mm.

Thus, while only one embodiment of the present invention has been shown and described, it will be obvious that many changes and modifications may be made thereunto, without departing from the spirit and scope of the invention.

What is claimed is:

1. In a motor vehicle pneumatic tire having a tread and made of polyurethane or another similar moldable material which hardens into an elastic plastic material and which has a substantially cylindrical belt insert mounted beneath the tread substantially composed of threads, wires or similar stability support elements which are mounted in the circumferential direction of the tire in a spaced-apart manner at a distance of 0.5–3.0 mm from one edge to the next and which have a cross section of 0.5–2.5 mm the improvement comprising:

(a) said stability support and the plastic mass of the belt insert encompassing the same having a tensile strength in the circumferential direction of at least 3 Million Newtons; and (b) said elements of said stability support having a breaking strength of at least 1,500 Newtons.

2. The pneumatic tire according to claim 1, wherein said stability support is made from a member selected from the group consisting of steel, polyester, aromatic polyamides, glass and materials of similar tensile strength.

3. The pneumatic tire according to claim 1 or 2, wherein the surface of the tread has a radius of curvature $\geq 270$ mm in transverse direction.

4. The pneumatic tire according to claim 1, wherein said stability support elements have a cross section of 1.0–1.9 mm.

* * * * *